(12) United States Patent
Rouault et al.

(10) Patent No.: US 11,532,823 B2
(45) Date of Patent: Dec. 20, 2022

(54) FLEXIBLE BATTERY

(71) Applicants:SOLVAY SA, Brussels (BE);
COMMISSARIAT A L'ENERGIE ATOMIQUE ET AUX ENERGIES ALTERNATIVES, Paris (FR)

(72) Inventors: Hélène Rouault, Le Versoud (FR);
Gaëlle Besnard, Grenoble (FR); Léo Merchat, Grenoble (FR); Jérémie Salomon, Villard De Lans (FR); Julio A. Abusleme, Saronno (IT);
Marc-David Braida, Bry-sur-Marne (FR); Christine Hamon, Bollate (IT)

(73) Assignee: SOLVAY SA, Brussels (BE)

(*) Notice: Subject to any disclaimer, the term of this patent is extended or adjusted under 35 U.S.C. 154(b) by 545 days.

(21) Appl. No.: 16/310,409

(22) PCT Filed: Jun. 13, 2017

(86) PCT No.: PCT/EP2017/064441
§ 371 (c)(1),
(2) Date: Dec. 14, 2018

(87) PCT Pub. No.: WO2017/216179
PCT Pub. Date: Dec. 21, 2017

(65) Prior Publication Data
US 2020/0321618 A1 Oct. 8, 2020

(30) Foreign Application Priority Data

Jun. 14, 2016 (EP) ..................... 16305720

(51) Int. Cl.
*H01M 4/66* (2006.01)
*H01M 4/04* (2006.01)
*H01M 4/58* (2010.01)
*H01M 10/0525* (2010.01)
*H01M 4/02* (2006.01)

(52) U.S. Cl.
CPC ......... *H01M 4/668* (2013.01); *H01M 4/0404* (2013.01); *H01M 4/5825* (2013.01); *H01M 10/0525* (2013.01); *H01M 2004/021* (2013.01)

(58) Field of Classification Search
CPC .. H01M 4/668; H01M 4/0404; H01M 4/5825; H01M 4/0409; H01M 4/621; H01M 4/623; H01M 4/13; H01M 4/139; H01M 4/667; H01M 4/624; H01M 10/0525; H01M 10/052; H01M 2004/021; H01M 50/446; H01M 4/62; H01M 4/362; H01M 4/366; Y02E 60/10
See application file for complete search history.

(56) References Cited

U.S. PATENT DOCUMENTS

| 5,707,763 | A | 1/1998 | Shimizu et al. | |
|---|---|---|---|---|
| 6,203,944 | B1 | 3/2001 | Turner et al. | |
| 2004/0234850 | A1* | 11/2004 | Watarai | H01M 4/667 429/217 |
| 2005/0129838 | A1* | 6/2005 | Naarmann | H01M 4/0404 427/58 |
| 2006/0032045 | A1* | 2/2006 | Naarmann | H01M 10/0436 29/623.3 |
| 2010/0075225 | A1* | 3/2010 | Wilkins | H01M 4/136 429/212 |
| 2015/0020947 | A1 | 1/2015 | Stanga et al. | |
| 2015/0294802 | A1* | 10/2015 | Kato | H01M 4/13 361/502 |
| 2016/0289439 | A1 | 10/2016 | Nagasawa et al. | |

FOREIGN PATENT DOCUMENTS

| WO | 9901232 A1 | 1/1999 | |
|---|---|---|---|
| WO | 0003444 A1 | 1/2000 | |
| WO | 2010138647 A1 | 12/2010 | |
| WO | WO2014/010681 | * 1/2014 | ............. H01M 4/66 |
| WO | 2015051928 A1 | 4/2015 | |
| WO | 2015079936 A1 | 6/2015 | |

* cited by examiner

*Primary Examiner* — Kiran Quraishi Akhtar
(74) *Attorney, Agent, or Firm* — Osha Bergman Watanabe & Burton LLP

(57) ABSTRACT

The present invention pertains to a flexible electrode, to a process for the manufacture of said flexible electrode and to uses of said flexible electrode in electrochemical devices, in particular in secondary batteries.

8 Claims, No Drawings

FLEXIBLE BATTERY

This application is a U.S. national stage entry under 35 U.S.C. § 371 of International Application No. PCT/EP2017/064441 filed Jun. 13, 2017, which claims priority to European application No. EP 16305720.1 filed on Jun. 14, 2016. The entire contents of these applications are explicitly incorporated herein by this reference.

TECHNICAL FIELD

The present invention pertains to a flexible electrode, to a process for the manufacture of said flexible electrode and to uses of said flexible electrode in electrochemical devices, in particular in secondary batteries.

BACKGROUND ART

Fluoropolymers are known in the art to be suitable as binders for the manufacture of electrodes for use in electrochemical devices such as secondary batteries.

Generally, techniques for manufacturing either positive or negative electrodes involve the use of organic solvents such as N-methyl-2-pyrrolidone for dissolving fluoropolymer binders and homogenizing them with an electro-active material and all other suitable components to produce a paste to be applied to a current collector.

The role of the organic solvent is typically to dissolve the fluoropolymer in order to bind the electro-active material particles to each together and to the current collector upon evaporation of the organic solvent.

The polymer binder should properly bind the electro-active material particles together and to the current collector so that these particles can chemically withstand large volume expansion and contraction during charging and discharging cycles.

A prerequisite for successful commercialization of secondary batteries, in particular Lithium-ion secondary batteries, is to secure battery safety in all environments.

Electrolytes suitable for use in electrochemical devices such as secondary batteries typically include liquid electrolytes and solid electrolytes.

In order for the electrolytes to be suitable for use in secondary batteries, they should exhibit high ionic conductivity, high chemical and electrochemical stability toward the electrodes and high thermal stability over a wide range of temperatures.

Liquid electrolytes suitable for use in Lithium-ion secondary batteries typically comprise Lithium salts dissolved in organic solvents.

However, critical safety issues may arise from overheating when a liquid electrolyte is heated above its flash point. In particular, thermal runaway may occur at high temperatures through chemical reaction of oxygen released by the cathode material with the organic liquid electrolyte as fuel.

In order to solve safety issues in Lithium-ion secondary batteries, gel polymer electrolytes have been studied which advantageously combine the advantages of both liquid electrolytes and solid polymer electrolytes thus being endowed with high ionic conductivity and high thermal stability.

However, as there is a growing need for low-cost, flexible and portable devices, such as mobile phones, laptop computers, personal digital assistants, electronic papers, and so forth, flexible rechargeable Lithium-ion batteries, which are energy sources of these portable devices, are attracting more rapidly increasing attention.

Nevertheless, in a flexible rechargeable Lithium-ion battery, the entire current collector is bent or deformed under the operational conditions and it may be partially delaminated from the electrode assembly. As a result, the charge-discharge cycle characteristics of the battery are greatly deteriorated and the overall cycle-life of the battery is reduced.

There is thus still the need in the art for flexible batteries exhibiting good electrochemical performances while possessing several unique features including high resilience, lightweight and easy portability.

SUMMARY OF INVENTION

It has been now surprisingly found that a flexible electrode can be manufactured easily by the process of the invention which successfully provides for electrochemical devices such as secondary batteries advantageously exhibiting outstanding electrochemical performances while ensuring outstanding mechanical resilience.

In a first instance, the present invention pertains to an electrode [electrode (E)] comprising:
a current collector comprising, preferably consisting of, a polymer substrate and, adhered to said polymer substrate, an electrically conductive layer, and
adhered to said electrically conductive layer of said current collector, at least one fluoropolymer layer comprising, preferably consisting of:
at least one fluoropolymer [polymer (F)],
at least one electro-active compound [compound (EA)],
a liquid medium [medium (L)],
optionally, at least one metal salt [salt (M)],
optionally, at least one conductive compound [compound (C)], and
optionally, one or more additives.

The electrode (E) of the invention preferably comprises:
a current collector comprising, preferably consisting of, a polymer substrate and, adhered to said polymer substrate, an electrically conductive layer, and
adhered to said electrically conductive layer of said current collector, at least one fluoropolymer layer comprising, preferably consisting of:
at least one fluoropolymer [polymer (F)],
at least one electro-active compound [compound (EA)],
a liquid medium [medium (L)],
at least one metal salt [salt (M)],
optionally, at least one conductive compound [compound (C)], and
optionally, one or more additives.

In a second instance, the present invention pertains to a process for the manufacture of an electrode [electrode (E)], said process comprising:
(i) providing a current collector comprising, preferably consisting of, a polymer substrate and, adhered to said polymer substrate, an electrically conductive layer,
(ii) providing an electrode-forming composition comprising, preferably consisting of:
at least one fluoropolymer [polymer (F)],
at least one electro-active compound [compound (EA)],
a liquid medium [medium (L)],
at least one organic solvent [solvent (S)] different from said medium (L),
optionally, at least one metal salt [salt (M)],
optionally, at least one conductive compound [compound (C)], and
optionally, one or more additives, (iii) applying the electrode-forming composition provided in step (ii) onto the electrically conductive layer of the current collector provided in step (i), and (iv) evaporating said at least one solvent (S) thereby providing an electrode [electrode (E)].

The choice of the solvent (S) is not particularly limited provided that it is suitable for solubilising the polymer (F).

The solvent (S) is typically selected from the group consisting of:
- alcohols such as methyl alcohol, ethyl alcohol and diacetone alcohol,
- ketones such as acetone, methylethylketone, methylisobutyl ketone, diisobutylketone, cyclohexanone and isophorone,
- linear or cyclic esters such as isopropyl acetate, n-butyl acetate, methyl acetoacetate, dimethyl phthalate and γ-butyrolactone,
- linear or cyclic amides such as N,N-diethylacetamide, N,N-dimethylacetamide, dimethylformamide and N-methyl-2-pyrrolidone, and
- dimethyl sulfoxide.

The current collector provided in step (i) of the process of the invention is typically manufactured by applying an electrically conductive layer onto a polymer substrate, preferably by any suitable procedures such as lamination, preferably co-lamination, typically using a double side adhesive tape, hot embossing, coating, printing, plating using electrochemical deposition or vacuum techniques such as physical vapor deposition, chemical vapor deposition and direct evaporation.

Under step (iii) of the process of the invention, the electrode-forming composition is applied onto the electrically conductive layer of the current collector typically by any suitable procedures such as casting, printing and roll coating.

Optionally, step (iii) may be repeated, typically one or more times, by applying the electrode-forming composition provided in step (iii) onto the electrode (E) provided in step (iv).

Under step (iv) of the process of the invention, drying may be performed either under atmospheric pressure or under vacuum. Alternatively, drying may be performed under modified atmosphere, e.g. under an inert gas, typically exempt notably from moisture (water vapor content of less than 0.001% v/v).

The drying temperature will be selected so as to effect removal by evaporation of one or more solvents (S) from the electrode (E) of the invention.

The electrode (E) of the invention is preferably free from one or more solvents (S).

The electrode (E) of the invention is advantageously obtainable by the process of the invention.

For the purpose of the present invention, the term "electro-active compound [compound (EA)]" is intended to denote a compound which is able to incorporate or insert into its structure and substantially release therefrom alkaline or alkaline-earth metal ions during the charging phase and the discharging phase of an electrochemical device. The compound (EA) is preferably able to incorporate or insert and release Lithium ions.

The nature of the compound (EA) of the electrode (E) of the invention depends on whether the electrode (E) thereby provided is a positive electrode [electrode (Ep)] or a negative electrode [electrode (En)].

In the case of forming a positive electrode [electrode (Ep)] for a Lithium-ion secondary battery, the compound (EA) may comprise a composite metal chalcogenide of formula $LiMQ_2$, wherein M is at least one metal selected from transition metals such as Co, Ni, Fe, Mn, Al, Cr and V and Q is a chalcogen such as 0 or S. Among these, it is preferred to use a Lithium-based composite metal oxide of formula $LiMO_2$, wherein M is the same as defined above. Preferred examples thereof may include $LiCoO_2$, $LiNiO_2$, $LiNi_xCo_{1-x}O_2$ (0<x<1) and spinel-structured $LiMn_2O_4$.

As an alternative, still in the case of forming a positive electrode [electrode (Ep)] for a Lithium-ion secondary battery, the compound (EA) may comprise a lithiated or partially lithiated transition metal oxyanion-based electro-active material of formula $M_1M_2(JO_4)_fE_{1-f}$, wherein $M_1$ is Lithium, which may be partially substituted by another alkali metal representing less than 20% of the $M_1$ metals, $M_2$ is a transition metal at the oxidation level of +2 selected from Fe, Mn, Ni, Al or mixtures thereof or at the oxidation level of +3 selected from V, Co or mixtures thereof, which may be partially substituted by one or more additional metals at oxidation levels between +1 and +5 and representing less than 35% of the $M_2$ metals, including 0, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the compound (EA) has formula $Li_{3-x}M'_yM''_{2-y}(JO_4)_3$ wherein $0 \leq x \leq 3$, $0 \leq y \leq 2$, M' and M'' are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the compound (EA) is a phosphate-based electro-active material of formula $Li(Fe_xMn_{1-x})PO_4$ wherein $0 \leq x \leq 1$, wherein x is preferably 1 (that is to say, Lithium iron phosphate of formula $LiFePO_4$).

In the case of forming a negative electrode [electrode (En)] for a Lithium-ion secondary battery, the compound (EA) may preferably comprise:
- graphitic carbons able to intercalate Lithium, typically existing in forms such as powders, flakes, fibers or spheres (for example, mesocarbon microbeads) hosting Lithium;
- Lithium metal;
- Lithium alloy compositions, including notably those described in U.S. Pat. No. 6,203,944 (3M INNOVATIVE PROPERTIES CO.) 20 Mar. 2001 and/or in WO 00/03444 (MINNESOTA MINING AND MANUFACTURING CO.) 20 Jan. 2000;
- Lithium titanates, generally represented by formula $Li_4Ti_5O_{12}$; these compounds are generally considered as "zero-strain" insertion materials, having low level of physical expansion upon taking up the mobile ions, i.e. $Li^+$;
- Lithium-silicon alloys, generally known as Lithium silicides with high Li/Si ratios, in particular Lithium silicides of formula $Li_{4.4}Si$;
- Lithium-germanium alloys, including crystalline phases of formula $Li_{4.4}Ge$;
- Lithium-tin and Lithium-antimony alloys.

The polymer (F) typically comprises recurring units derived from at least one fluorinated monomer.

The polymer (F) is preferably a partially fluorinated fluoropolymer.

For the purpose of the present invention, the term "partially fluorinated fluoropolymer" is intended to denote a polymer comprising recurring units derived from at least one fluorinated monomer and, optionally, at least one hydrogenated monomer, wherein at least one of said fluorinated monomer and said hydrogenated monomer comprises at least one hydrogen atom.

By the term "fluorinated monomer" it is hereby intended to denote an ethylenically unsaturated monomer comprising at least one fluorine atom.

By the term "hydrogenated monomer" it is hereby intended to denote an ethylenically unsaturated monomer comprising at least one hydrogen atom and free from fluorine atoms.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The polymer (F) may be a functional fluoropolymer [functional polymer (F)].

The functional polymer (F) typically comprises recurring units derived from at least one fluorinated monomer and at least one functional hydrogenated monomer.

The polymer (F) is advantageously a linear polymer [polymer $(F_L)$] comprising linear sequences of recurring units derived from at least one fluorinated monomer and, optionally, at least one functional hydrogenated monomer.

The polymer (F) is thus typically distinguishable from graft polymers.

The functional polymer (F) is advantageously a random polymer [polymer. $(F_R)$] comprising linear sequences of randomly distributed recurring units derived from at least one fluorinated monomer and at least one functional hydrogenated monomer.

The expression "randomly distributed recurring units" is intended to denote the percent ratio between the average number of sequences of at least one functional hydrogenated monomers (%), said sequences being comprised between two recurring units derived from at least one fluorinated monomer, and the total average number of recurring units derived from at least one functional hydrogenated monomer (%).

When each of the recurring units derived from at least one functional hydrogenated monomer is isolated, that is to say that a recurring unit derived from a functional hydrogenated monomer is comprised between two recurring units of at least one fluorinated monomer, the average number of sequences of at least one functional hydrogenated monomer equals the average total number of recurring units derived from at least one functional hydrogenated monomer, so that the fraction of randomly distributed recurring units derived from at least one functional hydrogenated monomer is 100%: this value corresponds to a perfectly random distribution of recurring units derived from at least one functional hydrogenated monomer. Thus, the larger is the number of isolated recurring units derived from at least one functional hydrogenated monomer with respect to the total number of recurring units derived from at least one functional hydrogenated monomer, the higher will be the percentage value of fraction of randomly distributed recurring units derived from at least one functional hydrogenated monomer.

The functional polymer (F) is thus typically distinguishable from block polymers.

According to a first embodiment of the invention, the polymer (F) may be a functional polymer (F) comprising recurring units derived from at least one fluorinated monomer, at least one functional hydrogenated monomer comprising at least one carboxylic acid end group and, optionally, at least one hydrogenated monomer different from said functional hydrogenated monomer comprising at least one carboxylic acid end group.

According to a second embodiment of the invention, the polymer (F) may be a functional polymer (F) comprising recurring units derived from at least one fluorinated monomer, at least one functional hydrogenated monomer comprising at least one hydroxyl end group and, optionally, at least one hydrogenated monomer different from said functional hydrogenated monomer comprising at least one hydroxyl end group.

The functional polymer (F) according to this first embodiment of the invention is particularly suitable for use in the electrode (E) of the invention.

The polymer (F) is typically obtainable by polymerization of at least one fluorinated monomer.

The functional polymer (F) is typically obtainable by polymerization of at least one fluorinated monomer and a least one functional hydrogenated monomer.

According to a first embodiment of the invention, the functional polymer (F) is typically obtainable by polymerization of at least one fluorinated monomer, at least one functional hydrogenated monomer comprising at least one carboxylic acid end group and, optionally, at least one hydrogenated monomer different from said functional hydrogenated monomer comprising at least one carboxylic acid end group.

According to a second embodiment of the invention, the functional polymer (F) is typically obtainable by polymerization of at least one fluorinated monomer, at least one functional hydrogenated monomer comprising at least one hydroxyl end group and, optionally, at least one hydrogenated monomer different from said functional hydrogenated monomer comprising at least one hydroxyl end group.

Should the fluorinated monomer comprise at least one hydrogen atom, it is designated as hydrogen-containing fluorinated monomer.

Should the fluorinated monomer be free of hydrogen atoms, it is designated as per(halo)fluorinated monomer.

The fluorinated monomer may further comprise one or more other halogen atoms (Cl, Br, I).

Non-limiting examples of suitable fluorinated monomers include, notably, the followings:

$C_2$-$C_8$ perfluoroolefins such as tetrafluoroethylene and hexafluoropropylene;

$C_2$-$C_8$ hydrogenated fluoroolefins such as vinylidene fluoride, vinyl fluoride, 1,2-difluoroethylene and trifluoroethylene;

perfluoroalkylethylenes of formula $CH_2=CH-R_{f0}$ wherein $R_{f0}$ is a $C_1$-$C_6$ perfluoroalkyl;

chloro- and/or bromo- and/or iodo-$C_2$-$C_6$ fluoroolefins such as chlorotrifluoroethylene;

(per)fluoroalkylvinylethers of formula $CF_2=CFOR_{f1}$ wherein $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers wherein $X_0$ is a $C_1-C_{12}$ alkyl group, a $C_1-C_{12}$ oxyalkyl group or a $C_1-C_{12}$ (per)fluorooxyalkyl group having one or more ether groups, such as perfluoro-2-propoxy-propyl group;

(per)fluoroalkylvinylethers of formula $CF_2=CFOCF_2OR_{f2}$ wherein $R_{f2}$ is a $C_1-C_6$ fluoro- or perfluoroalkyl group, e.g. $CF_3$, $C_2F_5$, $C_3F_7$ or a $C_1-C_6$ (per)fluorooxyalkyl group having one or more ether groups such as $—C_2F_5—O—CF_3$;

functional (per)fluoro-oxyalkylvinylethers of formula $CF_2=CFOY_0$ wherein $Y_0$ is a $C_1-C_{12}$ alkyl group or (per)fluoroalkyl group, a $C_1-C_{12}$ oxyalkyl group or a $C_1-C_{12}$ (per)fluorooxyalkyl group having one or more ether groups and $Y_0$ comprising a carboxylic or sulfonic acid group, in its acid, acid halide or salt form;

fluorodioxoles, preferably perfluorodioxoles.

Should the fluorinated monomer be a hydrogen-containing fluorinated monomer such as, for instance, vinylidene fluoride, trifluoroethylene or vinyl fluoride, the polymer (F) is either a partially fluorinated fluoropolymer comprising recurring units derived from at least one hydrogen-containing fluorinated monomer, at least one functional hydrogenated monomer and, optionally, at least one fluorinated monomer different from said hydrogen-containing fluorinated monomer or it is a partially fluorinated fluoropolymer comprising recurring units derived from at least one hydrogen-containing fluorinated monomer, at least one functional hydrogenated monomer, optionally, at least one fluorinated monomer different from said hydrogen-containing fluorinated monomer and, optionally, at least one hydrogenated monomer different from said functional hydrogenated monomer.

Should the fluorinated monomer be a per(halo)fluorinated monomer such as, for instance, tetrafluoroethylene, chlorotrifluoroethylene, hexafluoropropylene or a perfluoroalkylvinylether, the polymer (F) is a partially fluorinated fluoropolymer comprising recurring units derived from at least one per(halo)fluorinated monomer, at least one functional hydrogenated monomer, at least one hydrogenated monomer different from said functional hydrogenated monomer and, optionally, at least one fluorinated monomer different from said per(halo)fluorinated monomer.

The polymer (F) may be amorphous or semi-crystalline.

The term "amorphous" is hereby intended to denote a polymer (F) having a heat of fusion of less than 5 J/g, preferably of less than 3 J/g, more preferably of less than 2 J/g, as measured according to ASTM D-3418-08.

The term "semi-crystalline" is hereby intended to denote a polymer (F) having a heat of fusion of from 10 to 90 J/g, preferably of from 30 to 60 J/g, more preferably of from 35 to 55 J/g, as measured according to ASTM D3418-08.

The polymer (F) is preferably semi-crystalline.

The polymer (F) comprises preferably at least 0.01% by moles, more preferably at least 0.05% by moles, even more preferably at least 0.1% by moles of recurring units derived from at least one functional hydrogenated monomer.

The polymer (F) comprises preferably at most 20% by moles, more preferably at most 15% by moles, even more preferably at most 10% by moles, most preferably at most 3% by moles of recurring units derived from at least one functional hydrogenated monomer.

Determination of average mole percentage of recurring units derived from at least one functional hydrogenated monomer in the polymer (F) can be performed by any suitable method. Mention can be notably made of acid-base titration methods or NMR methods.

The functional polymer (F) is preferably a partially fluorinated fluoropolymer comprising recurring units derived from vinylidene fluoride (VDF), at least one functional hydrogenated monomer and, optionally, at least one fluorinated monomer different from VDF.

According to the first embodiment of the invention, the functional polymer (F) is preferably a partially fluorinated fluoropolymer comprising recurring units derived from vinylidene fluoride (VDF), at least one functional hydrogenated monomer comprising at least one carboxylic acid end group and, optionally, at least one fluorinated monomer different from VDF.

The functional polymer (F) of this first preferred embodiment of the invention more preferably comprises recurring units derived from:

at least 60% by moles, preferably at least 75% by moles, more preferably at least 85% by moles of vinylidene fluoride (VDF), from 0.01% to 20% by moles, preferably from 0.05% to 15% by moles, more preferably from 0.1% to 10% by moles of at least one functional hydrogenated monomer comprising at least one carboxylic acid end group, and optionally, from 0.1% to 15% by moles, preferably from 0.1% to 12% by moles, more preferably from 0.1% to 10% by moles of at least one fluorinated monomer selected from vinyl fluoride ($VF_1$), chlorotrifluoroethylene (CTFE), hexafluoropropylene (HFP), tetrafluoroethylene (TFE), trifluoroethylene (TrFE) and perfluoromethylvinylether (PMVE).

The functional hydrogenated monomer comprising at least one carboxylic acid end group is preferably selected from the group consisting of (meth)acrylic monomers of formula (I):

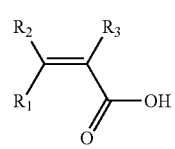

(I)

wherein each of $R_1$, $R_2$ and $R_3$, equal to or different from each other, is independently a hydrogen atom or a $C_1-C_3$ hydrocarbon group.

Non-limiting examples of functional hydrogenated monomers comprising at least one carboxylic acid end group include, notably, acrylic acid and methacrylic acid.

According to the second embodiment of the invention, the functional polymer (F) is preferably a partially fluorinated fluoropolymer comprising recurring units derived from vinylidene fluoride (VDF), at least one functional hydrogenated monomer comprising at least one hydroxyl end group and, optionally, at least one fluorinated monomer different from VDF.

The functional polymer (F) of this second preferred embodiment of the invention more preferably comprises recurring units derived from:

at least 60% by moles, preferably at least 75% by moles, more preferably at least 85% by moles of vinylidene fluoride (VDF), from 0.01% to 20% by moles, preferably from 0.05% to 15% by moles, more preferably from 0.1% to 10% by moles of at least one functional hydrogenated monomer comprising at least one hydroxyl end group, and optionally, from 0.1% to 15% by moles, preferably from 0.1% to 12% by moles, more preferably from 0.1% to 10% by moles of at least one fluorinated monomer selected from vinyl fluoride ($VF_1$), chlorotrifluoroethylene (CTFE), hexafluoropropylene (HFP), tetrafluoroethylene (TFE), trifluoroethylene (TrFE) and perfluoromethylvinylether (PMVE).

The polymer (F) is typically obtainable by emulsion polymerization or suspension polymerization.

For the purpose of the present invention, the term "liquid medium [medium (L)]" is intended to denote a medium comprising one or more substances in the liquid state at 20° C. under atmospheric pressure.

The medium (L) is typically free from one or more solvents (S).

The salt (M) is typically selected from the group consisting of:
(a) MeI, $Me(PF_6)_n$, $Me(BF_4)_n$, $Me(ClO_4)_n$, Me(bis(oxalato)borate)$_n$ ("$Me(BOB)_n$"), $MeCF_3SO_3$, $Me[N(CF_3SO_2)_2]_n$, $Me[N(C_2F_5SO_2)_2]_n$, $Me[N(CF_3SO_2)(R_FSO_2)]_n$, wherein $R_F$ is $C_2F_5$, $C_4F_9$ or $CF_3OCF_2CF_2$, $Me(AsF_6)_n$, $Me[C(CF_3SO_2)_3]_n$, $Me_2S_n$, wherein Me is a metal, preferably a transition metal, an alkaline metal or an alkaline-earth metal, more preferably Me being Li, Na, K or Cs, even more preferably Me being Li, and n is the valence of said metal, typically n being 1 or 2,
(b)

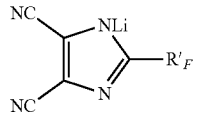

wherein $R'_F$ is selected from the group consisting of F, $CF_3$, $CHF_2$, $CH_2F$, $C_2HF_4$, $C_2H_2F_3$, $C_2H_3F_2$, $C_2F_5$, $C_3F_7$, $C_3H_2F_5$, $C_3H_4F_3$, $C_4F_9$, $C_4H_2F_7$, $C_4H_4F_5$, $C_5F_{11}$, $C_3F_5OCF_3$, $C_2F_4OCF_3$, $C_2H_2F_2OCF_3$ and $CF_2OCF_3$, and
(c) combinations thereof.

The amount of the medium (L) in the electrode (E) is typically at least 40% by weight, preferably at least 50% by weight, more preferably at least 60% by weight, based on the total weight of said medium (L) and the at least one polymer (F).

The concentration of the salt (M) in the medium (L) is advantageously at least 0.01 M, preferably at least 0.025 M, more preferably at least 0.05 M.

The concentration of the salt (M) in the medium (L) is advantageously at most 3 M, preferably at most 2 M, more preferably at most 1 M.

The medium (L) advantageously comprises, preferably consists of, at least one organic carbonate and, optionally, at least one ionic liquid.

Non-limiting examples of suitable organic carbonates include, notably, ethylene carbonate, propylene carbonate, mixtures of ethylene carbonate and propylene carbonate, dimethyl carbonate, diethyl carbonate, ethyl-methyl carbonate, butylene carbonate, fluoroethylene carbonate, fluoropropylene carbonate and mixtures thereof.

For the purpose of the present invention, the term "ionic liquid" is intended to denote a compound formed by the combination of a positively charged cation and a negatively charged anion in the liquid state at temperatures below 100° C. under atmospheric pressure.

The ionic liquid typically contains:
a positively charged cation selected from the group consisting of imidazolium, pyridinium, pyrrolidinium and piperidinium ions optionally containing one or more $C_1$-$C_{30}$ alkyl groups, and
a negatively charged anion selected from the group consisting of halides, perfluorinated anions and borates.

Non-limiting examples of $C_1$-$C_{30}$ alkyl groups include, notably, methyl, ethyl, propyl, iso-propyl, n-butyl, isobutyl, sec-butyl, t-butyl, pentyl, isopentyl, 2,2-dimethyl-propyl, hexyl, 2,3-dimethyl-2-butyl, heptyl, 2,2-dimethyl-3-pentyl, 2-methyl-2-hexyl, octyl, 4-methyl-3-heptyl, nonyl, decyl, undecyl and dodecyl groups.

The positively charged cation of the ionic liquid is preferably selected from the group consisting of:
a pyrrolidinium cation of formula (II):

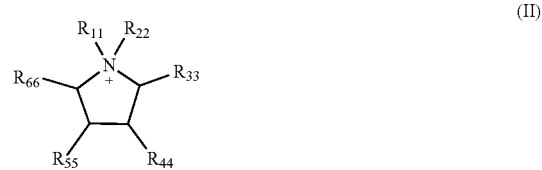

wherein $R_{11}$ and $R_{22}$, equal to or different from each other, independently represent a $C_1$-$C_8$ alkyl group and $R_{33}$, $R_{44}$, $R_{55}$ and $R_{88}$, equal to or different from each other, independently represent a hydrogen atom or a $C_1$-$C_{30}$ alkyl group, preferably a $C_1$-$C_{18}$ alkyl group, more preferably a $C_1$-$C_8$ alkyl group, and
a piperidinium cation of formula (III):

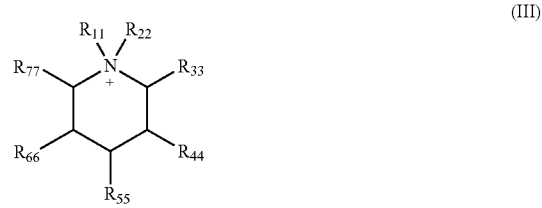

wherein $R_{11}$ and $R_{22}$, equal to or different from each other, independently represent a $C_1$-$C_8$ alkyl group and $R_{33}$, $R_{44}$, $R_{55}$, $R_{66}$ and $R_{77}$, equal to or different from each other, independently represent a hydrogen atom or a $C_1$-$C_{30}$ alkyl group, preferably a $C_1$-$C_{18}$ alkyl group, more preferably a $C_1$-$C_8$ alkyl group.

The positively charged cation of the ionic liquid is more preferably selected from the group consisting of:
a pyrrolidinium cation of formula (II-A):

a piperidinium cation of formula (III-A):

(III-A)

The negatively charged anion of the ionic liquid is preferably selected from the group consisting of:
bis(trifluoromethylsulphonyl)imide of formula $(SO_2CF_3)_2N^-$,
hexafluorophosphate of formula $PF_6^-$,
tetrafluoroborate of formula $BF_4^-$, and
oxaloborate of formula:

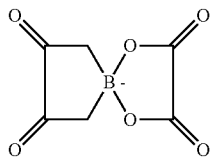

The ionic liquid even more preferably contains a pyrrolidinium cation of formula (II-A) as defined above and a perfluorinated anion selected from the group consisting of bis(trifluoromethylsulphonyl)imide of formula $(SO_2CF_3)_2N^-$, hexafluorophosphate of formula $PF_6^-$ and tetrafluoroborate of formula $BF_4^-$.

For the purpose of the present invention, the term "conductive compound [compound (C)]" is intended to denote a compound able to impart electron conductivity to the electrode.

The compound (C) is typically selected from the group consisting of carbonaceous materials such as carbon black, carbon nanotubes, graphite powder, graphite fiber and metal powders or fibers such as nickel and aluminium powders or fibers.

The fluoropolymer layer of the electrode (E) of the invention may further comprise one or more additives, preferably in an amount of from 0.1% to 10% by weight, more preferably from 0.5% to 7% by weight, based on the weight of the medium (L).

The fluoropolymer layer of the electrode (E) of the invention may further comprise one or more additives such as vinylene carbonate, vinyl ethylene carbonate, allyl ethyl carbonate, vinyl acetate, divinyl adipate, acrylic acid nitrile, 2-vinyl pyridine, maleic anhydride, methyl cinnamate, alkyl phosphonates, and vinyl-containing silane-based compounds.

The polymer substrate of the current collector of the electrode (E) of the invention typically comprises, preferably consists of, at least one semi-crystalline polymer.

For the purpose of the present invention, the term "semi-crystalline" is intended to denote a polymer having a heat of fusion of from 10 to 90 J/g, preferably of from 30 to 60 J/g, more preferably of from 35 to 55 J/g, as measured according to ASTM D3418-08.

The polymer substrate of the current collector of the electrode (E) of the invention preferably comprises, more preferably consists of, at least one semi-crystalline polymer having a melting point higher than 130° c., preferably higher than 150° C., more preferably higher than 200° C.

The polymer substrate of the current collector of the electrode (E) of the invention more preferably comprises, even more preferably consists of, at least one semi-crystalline polymer selected from the group consisting of halopolymers such as polyvinylidene chloride, fluoropolymers, polyesters, polyolefins such as polypropylenes, polyamides such as aromatic polyamides and polycarbonates.

Non-limiting examples of suitable fluoropolymers include partially fluorinated fluoropolymers comprising recurring units derived from at least one hydrogen-containing fluorinated monomer such as vinylidene fluoride (VDF) or at least one per(halo)fluorinated monomer such as chlorotrifluoroethylene (CTFE) and/or tetrafluoroethylene (TFE).

The polymer substrate of the current collector of the electrode (E) of the invention more preferably comprises, even more preferably consists of, at least one partially fluorinated fluoropolymer comprising recurring units derived from:
 at least one per(halo)fluorinated monomer selected from the group consisting of tetrafluoroethylene (TFE) and chlorotrifluoroethylene (CTFE),
 at least one hydrogenated monomer selected from ethylene, propylene and isobutylene, and
 optionally, one or more additional monomers, typically in amounts of from 0.1% to 30% by moles, based on the total amount of TFE and/or CTFE and said hydrogenated monomer(s).

The polymer substrate of the current collector of the electrode (E) of the invention even more preferably comprises, still more preferably consists of, at least one partially fluorinated fluoropolymer comprising:
 from 35% to 65%, preferably from 45% to 55% by moles of ethylene (E),
 from 65% to 35%, preferably from 55% to 45% by moles of at least one of chlorotrifluoroethylene (CTFE) and tetrafluoroethylene (TFE) or a mixture thereof, and
 optionally, from 0.1% to 30% by moles, based on the total amount of TFE and/or CTFE and ethylene, of one or more additional monomers.

The electrically conductive layer of the current collector of the electrode (E) of the invention typically comprises, preferably consists of, Carbon (C) or Silicon (Si) or at least one metal selected from the group consisting of Lithium (Li), Sodium (Na), Zinc (Zn), Magnesium (Mg), Copper (Cu), Aluminium (Al), Nickel (Ni), Titanium (Ti) and alloys thereof including, but not limited to, stainless steel.

The electrically conductive layer of the current collector of the electrode (E) of the invention is typically in the form of a foil, mesh or net.

The electrically conductive layer of the current collector of the electrode (E) of the invention typically has a thickness of from 0.1 μm to 100 μm, preferably from 2 μm to 50 μm, more preferably from 5 μm to 20 μm.

The fluoropolymer layer of the electrode (E) of the invention typically has a thickness of from 5 μm to 500 μm, preferably from 10 μm to 200 μm, more preferably from 30 μm to 100 μm.

The electrode (E) of the invention is particularly suitable for use in electrochemical devices, in particular in secondary batteries.

For the purpose of the present invention, the term "secondary battery" is intended to denote a rechargeable battery.

The secondary battery of the invention is preferably a secondary battery based on any of Lithium (Li), Sodium (Na), Potassium (K), Magnesium (Mg), Calcium (Ca), Zinc (Zn) and Yttrium (Y).

The secondary battery of the invention is more preferably a Lithium-ion secondary battery.

In a third instance, the present invention pertains to an electrochemical device comprising at least one electrode (E) of the invention.

In a fourth instance, the present invention further pertains to a secondary battery comprising:
 a positive electrode,
 a negative electrode, and
 between said positive electrode and said negative electrode, a membrane,
wherein at least one of the positive electrode and the negative electrode is the electrode (E) of the invention.

For the purpose of the present invention, the term "membrane" is intended to denote a discrete, generally thin, interface which moderates permeation of chemical species in contact with it. This interface may be homogeneous, that is, completely uniform in structure (dense membrane), or it may be chemically or physically heterogeneous, for example containing voids, pores or holes of finite dimensions (porous membrane).

The nature of the current collector of the electrode (E) of the invention depends on whether the electrode (E) thereby provided is a positive electrode [electrode (Ep)] or a negative electrode [electrode (En)].

Should the electrode (E) of the invention be a positive electrode [electrode (Ep)], the current collector typically comprises, preferably consists of, Carbon (C) or at least one metal selected from the group consisting of Aluminium (Al), Nickel (Ni), Titanium (Ti) and alloys thereof.

Should the electrode (E) of the invention be a positive electrode [electrode (Ep)], the current collector preferably consists of aluminium (Al).

Should the electrode (E) of the invention be a negative electrode [electrode (En)], the current collector typically comprises, preferably consists of, Carbon (C) or Silicon (Si) or at least one metal selected from the group consisting of Lithium (Li), Sodium (Na), Zinc (Zn), Magnesium (Mg), Copper (Cu) and alloys thereof.

Should the electrode (E) of the invention be a negative electrode [electrode (En)], the current collector preferably consists of Copper (Cu).

The membrane typically comprises at least one material selected from inorganic materials and organic materials.

Non-limiting examples of suitable organic materials include, notably, polymers, said polymers being preferably selected from the group consisting of polymers (F), preferably partially fluorinated polymers (F).

The membrane is advantageously free from one or more compounds (EA) as defined above.

The membrane may further comprise a medium (L) as defined above.

The membrane may still further comprise at least one salt (M) as defined above.

The membrane typically comprises, preferably consists of, at least one fluoropolymer hybrid organic/inorganic composite, a liquid medium [medium (L)] as defined above and, optionally, at least one metal salt [salt (M)] as defined above.

According to a first embodiment of the invention, the membrane is typically obtainable by a process comprising hydrolysing and/or condensing a composition comprising, preferably consisting of:
 at least one fluoropolymer [polymer (F)],
 at least one metal compound [compound (M1)] of formula (IV):

wherein m is an integer from 1 to 4, A is a metal selected from the group consisting of Si, Ti and Zr, Y is a hydrolysable group and X is a hydrocarbon group, optionally comprising one or more functional groups,
 a liquid medium [medium (L)], and
 optionally, at least one metal salt [salt (M)].

The selection of the hydrolysable group Y of the compound (M1) of formula (IV) as defined above is not particularly limited provided that it enables under appropriate conditions the formation of a —O—A≡ bond. The hydrolysable group Y of the compound (M1) of formula (IV) as defined above is typically selected from the group consisting of halogen atoms, preferably being a chlorine atom, hydrocarboxy groups, acyloxy groups and hydroxyl groups.

In case the compound (M1) of formula (IV) as defined above comprises at least one functional group on group X, it will be designated as functional compound (M1); in case none of groups X of the compound (M1) of formula (IV) as defined above comprise a functional group, the compound (M1) of formula (IV) as defined above will be designated as non-functional compound (M1).

The compound (M1) is preferably of formula (IV-A):

$$R^A{}_{4-m}A(OR^B)_m \qquad \text{(IV-A)}$$

wherein m is an integer from 1 to 4, and, according to certain embodiments, from 1 to 3, A is a metal selected from the group consisting of Si, Ti and Zr, $R^A$ and $R^B$, equal to or different from each other and at each occurrence, are independently selected from $C_1$-$C_{18}$ hydrocarbon groups, wherein $R^A$ optionally comprises at least one functional group.

Non-limiting examples of functional groups include, notably, epoxy group, carboxylic acid group (in its acid, ester, amide, anhydride, salt or halide form), sulphonic group (in its acid, ester, salt or halide form), hydroxyl group, phosphoric acid group (in its acid, ester, salt, or halide form), thiol group, amine group, quaternary ammonium group, ethylenically unsaturated group (like vinyl group), cyano group, urea group, organo-silane group, aromatic group.

Should the compound (M1) of formula (IV) as defined above be a functional compound (M1), it is more preferably of formula (IV-B):

wherein m is an integer from 1 to 3, A is a metal selected from the group consisting of Si, Ti and Zr, $R^{A'}$, equal to or different from each other and at each occurrence, is a $C_1$-$C_{12}$ hydrocarbon group comprising at least one functional group and $R^{B'}$, equal to or different from each other and at each occurrence, is a $C_1$-$C_5$ linear or branched alkyl group, preferably $R^{B'}$ being a methyl or ethyl group.

Examples of functional compounds (M1) are notably vinyltriethoxysilane, vinyltrimethoxysilane, vinyltrismethoxyethoxysilane of formula $CH_2$=$CHSi(OC_2H_4OCH_3)_3$, 2-(3,4-epoxycyclohexylethyltrimethoxysilane) of formula:

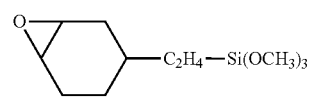

glycidoxypropylmethyldiethoxysilane of formula:

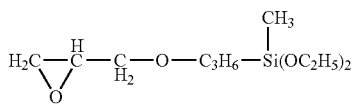

glycidoxypropyltrimethoxysilane of formula:

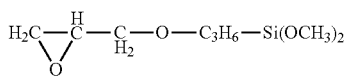

methacryloxypropyltrimethoxysilane of formula:

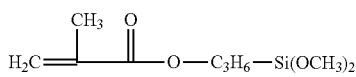

aminoethylaminpropylmethyldimethoxysilane of formula:

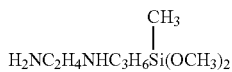

aminoethylaminpropyltrimethoxysilane of formula:

$H_2NC_2H_4NHC_3H_6Si(OCH_3)_3$ 3-aminopropyltriethoxysilane, 3-phenylaminopropyltrimethoxysilane,
3-chloroisobutyltriethoxysilane, 3-chloropropyltrimethoxysilane,
3-mercaptopropyltriethoxysilane, 3-mercaptopropyltrimethoxysilane,
n-(3-acryloxy-2-hydroxypropyl)-3-am inopropyltriethoxysilane,
(3-acryloxypropyl)dimethylmethoxysilane,
(3-acryloxypropyl)methyldichlorosilane,
(3-acryloxypropyl)methyldimethoxysilane,
3-(n-allylamino)propyltrimethoxysilane,
2-(4-chlorosulfonylphenyl)ethyltrimethoxysilane,
2-(4-chlorosulphonylphenyl)ethyl trichlorosilane, carboxyethylsilanetriol,
and its sodium salts, triethoxysilylpropylmaleamic acid of formula:

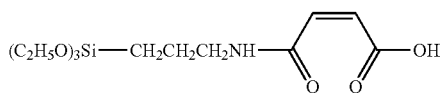

3-(trihydroxysilyl)-1-propane-sulphonic acid of formula $HOSO_2$—$CH_2CH_2CH_2$—$Si(OH)_3$, N-(trimethoxysilylpropyl)ethylene-diamine triacetic acid, and its sodium salts, 3-(triethoxysilyl)propylsuccinic anhydride of formula:

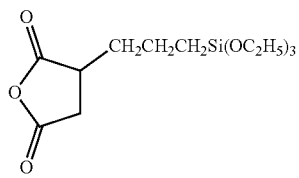

acetamidopropyltrimethoxysilane of formula $H_3C$—$C(O)NH$—$CH_2CH_2CH_2$—$Si(OCH_3)_3$, alkanolamine titanates of formula $Ti(L)_x(OR)_y$, wherein L is an amine-substituted alkoxy group, e.g. $OCH_2CH_2NH_2$, R is an alkyl group, and x and y are integers such that x+y=4.

Examples of non-functional compounds (M1) are notably trimethoxysilane, triethoxysilane, tetramethoxysilane, tetraethoxysilane (TEOS), tetramethyltitanate, tetraethyltitanate, tetra-n-propyltitanate, tetraisopropyltitanate, tetra-n-butyltitanate, tetra-isobutyl titanate, tetra-tert-butyl titanate, tetra-n-pentyltitanate, tetra-n-hexyltitanate, tetraisooctyltitanate, tetra-n-lauryl titanate, tetraethylzirconate, tetra-n-propylzirconate, tetraisopropylzirconate, tetra-n-butyl zirconate, tetra-sec-butyl zirconate, tetra-tert-butyl zirconate, tetra-n-pentyl zirconate, tetra-tert-pentyl zirconate, tetra-tert-hexyl zirconate, tetra-n-heptyl zirconate, tetra-n-octyl zirconate, tetra-n-stearyl zirconate.

According to a second embodiment of the invention, the membrane is typically obtainable by a process comprising hydrolysing and/or condensing a composition comprising, preferably consisting of:

at least one functional fluoropolymer [functional polymer (F)] comprising recurring units derived from at least one functional hydrogenated monomer comprising at least one hydroxyl end group, at least one metal compound [compound (M2)] of formula (V):

$$X'_{4-m'}A'Y'_{m'} \qquad (V)$$

wherein m' is an integer from 1 to 3, A' is a metal selected from the group consisting of Si, Ti and Zr, Y' is a hydrolysable group and X' is a hydrocarbon group comprising at least one —N=C=O functional group, optionally, at least one metal compound [compound (M1)] of formula (IV), a liquid medium [medium (L)], and optionally, at least one metal salt [salt (M)].

The selection of the hydrolysable group Y' of the compound (M2) of formula (V) as defined above is not particularly limited provided that it enables under appropriate conditions the formation of a —O-A≡ bond. The hydrolysable group Y' of the compound (M2) of formula (V) as defined above is typically selected from the group consisting of halogen atoms, preferably being a chlorine atom, hydrocarboxy groups, acyloxy groups and hydroxyl groups.

The compound (M2) is preferably of formula (V-A):

$$R^C{}_{4m'}A'(OR^D)_{m'} \qquad (V-A)$$

wherein m' is an integer from 1 to 3, A' is a metal selected from the group consisting of Si, Ti and Zr, $R^C$, equal to or different from each other and at each occurrence, is a $C_1$-$C_{12}$ hydrocarbon group comprising at least one —N=C=O functional group and $R^D$, equal to or different from each other and at each occurrence, is a $C_1$-$C_5$ linear or branched alkyl group, preferably $R^D$ being a methyl or ethyl group.

The compound (M2) is more preferably of formula (V-B):

$$O=C=N-R^{C'}-A'-(OR^{D'})_3 \qquad (V-B)$$

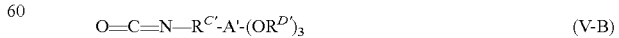

wherein A' is a metal selected from the group consisting of Si, Ti and Zr, $R^{C'}$, equal to or different from each other and at each occurrence, is a linear or branched $C_1$-$C_{12}$ hydrocarbon group and $R^{D'}$, equal to or different from each other and at each occurrence, is a $C_1$-$C_5$ linear or branched alkyl group, preferably $R^{D'}$ being a methyl or ethyl group.

Non-limiting examples of suitable compounds (M2) include the followings:
trimethoxysilyl methyl isocyanate, triethoxysilyl methyl isocyanate,
trimethoxysilyl ethyl isocyanate, triethoxysilyl ethyl isocyanate,
trimethoxysilyl propyl isocyanate, triethoxysilyl propyl isocyanate,
trimethoxysilyl butyl isocyanate, triethoxysilyl butyl isocyanate,
trimethoxysilyl pentyl isocyanate, triethoxysilyl pentyl isocyanate,
trimethoxysilyl hexyl isocyanate and triethoxysilyl hexyl isocyanate.

Should the compound (M1) of formula (IV) as defined above in the membrane according to this second embodiment of the invention be a functional compound (M1), it typically comprises at least one functional group different from the —N=C=O functional group.

The functional hydrogenated monomer comprising at least one hydroxyl end group is preferably selected from the group consisting of (meth)acrylic monomers of formula (VI) and vinylether monomers of formula (VII):

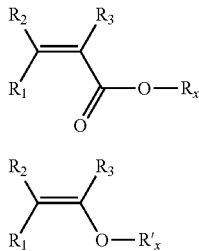

(VI)

(VII)

wherein each of $R_1$, $R_2$ and $R_3$, equal to or different from each other, is independently a hydrogen atom or a $C_1$-$C_3$ hydrocarbon group, and $R_X$ is a $C_1$-$C_5$ hydrocarbon moiety comprising at least one hydroxyl group.

The functional hydrogenated monomer comprising at least one hydroxyl end group is more preferably of formula (VI) as defined above.

The functional hydrogenated monomer comprising at least one hydroxyl end group is even more preferably of formula (VI-A):

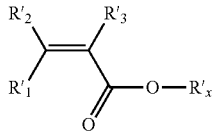

(VI-A)

wherein $R'_1$, $R'_2$ and $R'_3$ are hydrogen atoms and $R'_X$ is a $C_1$-$C_5$ hydrocarbon moiety comprising at least one hydroxyl group.

Non-limiting examples of functional hydrogenated monomers comprising at least one hydroxyl end group include, notably,
hydroxyethyl(meth)acrylate, hydroxypropyl(meth)acrylate, hydroxyethylhexyl(meth)acrylate.

The functional hydrogenated monomer comprising at least one hydroxyl end group is even more preferably selected from the followings:

hydroxyethyl acrylate (HEA) of formula:

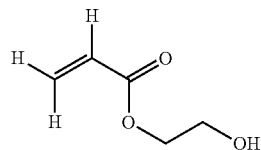

2-hydroxypropyl acrylate (HPA) of either of formulae:

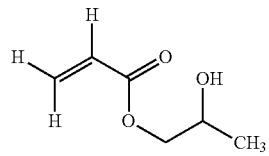

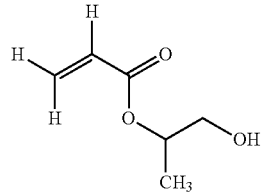

and mixtures thereof.

The fluoropolymer hybrid organic/inorganic composite typically comprises, preferably consists of, fluoropolymer domains and inorganic domains, wherein the inorganic domains are obtainable by hydrolysing and/or condensing at least one pendant side chain comprising an end group of formula —O—C(O)—NH—Z—$AY_mX_{3-m}$ (M1-g), wherein m, Y, A, X have the same meaning as defined above and Z is a hydrocarbon group, optionally comprising at least one functional group, optionally, at least one pendant side chain comprising an end groups of formula —O-$A'Y'_{m'-1}X'_{4-m'}$ (M2-g), wherein m', Y', A', X' have the same meaning as defined above.

The secondary battery of the invention preferably comprises:
a positive electrode,
a negative electrode, and
between said positive electrode and said negative electrode, a membrane,
wherein at least one of the positive electrode and the negative electrode is the electrode (E) of the invention, wherein the fluoropolymer layer comprises, preferably consists of:
at least one fluoropolymer [polymer (F)],
at least one electro-active compound [compound (EA)],
a liquid medium [medium (L)],
at least one metal salt [salt (M)],
optionally, at least one conductive compound [compound (C)], and
optionally, one or more additives.

The secondary battery of the invention more preferably comprises:
a positive electrode,
a negative electrode, and
between said positive electrode and said negative electrode, a membrane,
wherein at least one of the positive electrode and the negative electrode is the electrode (E) of the invention, wherein the fluoropolymer layer comprises, preferably consists of:

at least one fluoropolymer [polymer (F)],
at least one electro-active compound [compound (EA)],
a liquid medium [medium (L)],
at least one metal salt [salt (M)],
optionally, at least one conductive compound [compound (C)], and
optionally, one or more additives, and
wherein said membrane comprises, preferably consists of, at least one fluoropolymer hybrid organic/inorganic composite, a liquid medium [medium (L)] as defined above and, optionally, at least one metal salt [salt (M)] as defined above.

The secondary battery of the invention even more preferably comprises:
a positive electrode,
a negative electrode, and
between said positive electrode and said negative electrode, a membrane,
wherein at least one of the positive electrode and the negative electrode is the electrode (E) of the invention, wherein the fluoropolymer layer comprises, preferably consists of:
at least one fluoropolymer [polymer (F)],
at least one electro-active compound [compound (EA)],
a liquid medium [medium (L)],
at least one metal salt [salt (M)],
optionally, at least one conductive compound [compound (C)], and
optionally, one or more additives, and
wherein said membrane comprises, preferably consists of, at least one fluoropolymer hybrid organic/inorganic composite and a liquid medium [medium (L)] as defined above.

The Applicant thinks, without this limiting the scope of the invention, that one or more salts (M) and, optionally, one or more additives advantageously migrate from any of the electrodes comprising said salt(s) (M) towards a membrane free from one or more salts (M) thereby ensuring good electrochemical performances of the secondary battery thereby provided.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (F-A): VDF-AA (0.9% by moles)-HFP (2.4% by moles) polymer having an intrinsic viscosity of 0.30 l/g in DMF at 25° C.

Polymer (F-B): VDF-AA (0.9% by moles) polymer having an intrinsic viscosity of 0.30 l/g in DMF at 25° C.

Polymer (A): VDF-HEA (0.8% by moles)-HFP (2.4% by moles) polymer having an intrinsic viscosity of 0.08 l/g in DMF at 25° C.

Graphite: 75% SMG HE2-20 (Hitachi Chemical Co., Ltd.)/25% TIMREX® SFG 6 (Timcal Ltd.).

LiTFSI: bis(trifluoromethanesulfonyl)imide Lithium salt.
TSPI: 3-(triethoxysilyl)propyl isocyanate.
DBTDL: dibutyl tin dilaurate.

Determination of Intrinsic Viscosity of Polymer (F)

Intrinsic viscosity (η) [dl/g] was measured using the following equation on the basis of dropping time, at 25° C., of a solution obtained by dissolving the polymer (F) in N,N-dimethylformamide at a concentration of about 0.2 g/dl using a Ubbelhode viscosimeter:

$$[\eta] = \frac{\eta_{sp} + \Gamma \cdot \ln\eta_r}{(1+\Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r$-1, and $\Gamma$ is an experimental factor, which for polymer (F) corresponds to 3.

General Procedure for the Manufacture of a Current Collector

A double side adhesive tape (Adhesive 300LSE-3M) was applied onto a film of HALAR® 500 ECTFE (50 μm) thereby providing a film of ECTFE having one face ready to stick after removal of the protective film on the adhesive tape.

An Aluminium foil having a thickness of 15 μm was applied by lamination onto the film of ECTFE so obtained thereby providing a current collector suitable for use in a positive electrode.

Also, a Copper foil having a thickness of 8 μm was applied by lamination onto another film of ECTFE so obtained thereby providing a current collector suitable for use in a negative electrode.

General Procedure for the Manufacture of a Negative Electrode

A solution of polymer (F-A) in acetone was prepared at 60° C. and then brought to room temperature. Then, graphite was added to the solution so obtained in a weight ratio of 90:10 (graphite: polymer (F-A)).

In the next step, an electrolyte medium was added, said electrolyte medium consisting of a mixture of ethylene carbonate (EC) and propylene carbonate (PC) (1/1 by volume) in which LiTFSI (1 mol/L) was added and vinylene carbonate (VC) (2% by weight) was finally added.

The weight ratio $[m_{electrolyte}/(m_{electrolyte}+m_{polymer\ (F-A)})] \times 100$ was 75%.

General Procedure for the Manufacture of a Positive Electrode

A solution of polymer (F-A) in acetone was prepared at 60° C. and then brought to room temperature. Then, a composition comprising a blend of 50% by weight of C-NERGY® SUPER C65 carbon black (CB) and 50% by weight of VGCF® carbon fiber (CF) and LiFePO$_4$ (LFP) was added to the solution so obtained in a weight ratio of 92.8:7.2 ((CB+CF+LFP):polymer (F-A)). The (CB+CF)/LFP weight ratio was 7.8:92.2.

In the next step, an electrolyte medium was added, said electrolyte medium consisting of a mixture of ethylene carbonate (EC) and propylene carbonate (PC) (1/1 by volume) in which LiTFSI (1 mol/L) was added and vinylene carbonate (VC) (2% by weight) was finally added.

The weight ratio $[m_{electrolyte}/(m_{electrolyte}+m_{polymer\ (F-A)})] \times 100$ was 85.8%.

Casting Procedure

The solution mixture was spread with a constant thickness onto the electrically conductive layer of the current collector using a tape casting machine (doctor blade). The thickness was controlled by the distance between the knife and the current collector. The thickness for the negative electrode was about 120 μm. The thickness for the positive electrode was about 250 μm.

The electrode was then dried during 30 minutes under air at room temperature.

General Procedure for the Manufacture of a Membrane

The polymer (A) (1.5 g) was dissolved in 8.5 g of acetone at 60° C. thereby providing a solution containing 15% by weight of said polymer (F-A). DBTDL (0.015 g) was then added. The solution was homogenized at 60° C. TSPI (0.060 g) was added thereto. The quantity of DBTDL was calculated to be 10% by moles vs. TSPI. TSPI itself was calculated to be 1.1% by moles vs. the polymer 1. Once again, the solution was homogenized at 60° C. and then it was left at 60° C. for about 90 min so as to let isocyanate functional groups of TSPI to react with the hydroxyl groups of the polymer (A).

In the next step, an electrolyte medium was added, said electrolyte medium consisting of a mixture of ethylene carbonate (EC) and propylene carbonate (PC) (1/1 by volume) in which LiTFSI (1 mol/L) was added and vinylene carbonate (VC) (2% by weight) was finally added.

The weight ratio $[m_{electrolyte}/(m_{electrolyte}+m_{polymer\ (A)})]$ was 80%. After homogenization at 60° C., formic acid was added. The solution was homogenized at 60° C. and TEOS was then added thereto.

The quantity of TEOS was calculated from the weight ratio $(m_{SiO2}/m_{polymer\ (A)})$ assuming total conversion of TEOS into $SiO_2$. This ratio was 10%.

The quantity of formic acid was calculated from the following equation:

$$n_{formic\ acid}/n_{TEOS}=4.9.$$

The solution mixture was spread with a constant thickness onto a PET substrate using a tape casting machine (doctor blade). The thickness was controlled by the distance between the knife and the PET film to set a value of 250 μm.

The membrane was dried during 20 minutes at 55° C. and then it was detached from the PET substrate. The membrane so obtained had a constant thickness of 40 μm.

EXAMPLE 1

A pouch cell battery (34×36 mm) was manufactured by assembling the membrane as described hereinabove between the positive electrode and the negative electrode as described hereinabove.

The battery was first charged at a C/20 rate, then discharged at a D/20 rate and successively run at C/10-D/10 rates.

After the 4 cycles at a D/10 rate, the battery was bent on a tube of 7.5 mm external radio covering 50% of the radial surface for 30 seconds; when the applied stress was removed, the battery recovered the original planar form of the pouch cell.

The battery continued to work regularly, as shown in Table 1, for 9 cycles. The battery was then again bent in the other direction. The battery continued cycling for 25 cycles, as shown in Table 1, by keeping substantially unmodified its capacity values.

The average discharge capacity values of the battery so obtained are set forth in Table 1 here below:

TABLE 1

| Cycle No | Average Discharge Capacity [mAh/g] | [%] |
| --- | --- | --- |
| 1 | 80.2 | 100.0 |
| 2 | 72.1 | 89.9 |
| 3 | 69.7 | 86.9 |
| 4 | 69.0 | 86.0 |
| 5 | 80.1 | 99.9 |

TABLE 1-continued

| Cycle No | Average Discharge Capacity [mAh/g] | [%] |
| --- | --- | --- |
| 6 | 79.6 | 99.3 |
| 9 | 78.2 | 97.5 |
| 10 | 77.8 | 97.0 |
| 12 | 79.3 | 98.9 |
| 25 | 72.6 | 90.5 |

EXAMPLE 2

A pouch cell battery (34×36 mm) was manufactured by assembling the membrane as described hereinabove between the positive electrode and the negative electrode as described hereinabove.

The battery was run at D/10 discharge rates.

After 6 cycles, the battery was fixed and bent on a tube having an external diameter of 1.5 cm and then tested. The battery continued to work regularly, as shown in Table 2, for 5790 min (9 cycles) by keeping substantially unmodified its capacity values.

After 14 cycles, the applied stress was removed and the battery recovered the original planar form of the pouch cell. The battery continued to work regularly.

The average discharge capacity values of the battery so obtained are set forth in Table 2 here below:

TABLE 2

| Cycle No | Average Discharge Capacity [mAh/g] | [%] |
| --- | --- | --- |
| 1 | 99.4 | 100.0 |
| 3 | 98.9 | 99.5 |
| 6 | 94.5 | 95.1 |
| 7 | 61.7 | 62.1 |
| 10 | 66.2 | 66.6 |
| 14 | 67.5 | 67.9 |
| 15 | 82.9 | 83.4 |
| 18 | 83.9 | 84.4 |
| 25 | 83.4 | 83.9 |

COMPARATIVE EXAMPLE 1

A pouch cell (36×36 mm) was manufactured by assembling the membrane as described hereinabove between a standard positive electrode (non-gel positive electrode) and a standard negative electrode (non-gel negative electrode).

The non-gel electrodes were manufactured using a 12% by weight solution of polymer (F-B) in N-methyl 2-pyrrolidone (NMP).

Negative electrode: graphite was added to the solution so obtained in a weight ratio of 96:4 (graphite/polymer (F-B)).

Positive electrode: a composition comprising a blend of 50% by weight of C-NERGY® SUPER C65 carbon black and 50% by weight of VGCF® carbon fiber (CF) and $LiFePO_4$ (LFP) was added to the solution so obtained in a weight ratio of 95.5:4.5 ((CF+LFP):polymer (F-B)). The CF/LFP weight ratio was 4:96.

The solution mixture was screen printed onto a metal collector using a stencil screen with a thickness of 250 μm for the negative electrode and 350 μm for the positive electrode.

NMP was evaporated by drying at 60° C. during one night and the electrodes so obtained were then calendered so as to provide a final thickness of 100 μm for the negative electrode and 112 μm for the positive electrode.

The battery so obtained did not work. The pouch cell was sandwiched between two sheets of glass to ensure a better electrical contact between the layers but it still did not start to charge.

COMPARATIVE EXAMPLE 2

The same procedure as detailed under Comparative Example 1 was followed but using a stencil screen with a thickness of 400 μm for the negative electrode. The negative electrode was dried at 50° C. for 30 min. The battery so obtained did not work.

In view of the above, it has been found that the electrode of the invention successfully provides for electrochemical devices such as secondary batteries advantageously exhibiting outstanding electrochemical performances while ensuring outstanding mechanical resilience.

The invention claimed is:

1. An electrode (E) comprising: a current collector comprising, a polymer substrate and, adhered to said polymer substrate, an electrically conductive layer, wherein the electrically conductive layer is in the form of a foil, mesh, or net, and adhered to said electrically conductive layer of said current collector, at least one fluoropolymer layer comprising: at least one polymer (F), wherein polymer (F) is a fluoropolymer, at least one electro-active compound (EA), a liquid medium (L), wherein the medium (L) comprises at least one organic carbonate and, optionally, at least one ionic liquid, optionally, at least one metal salt (M), optionally, at least one conductive compound (C), and optionally, one or more additives; wherein the polymer substrate of the current collector comprises least one polymer selected from the group consisting of fluoropolymers; wherein the polymer substrate of the current collector comprises at least one polymer selected from the group consisting of partially fluorinated fluoropolymers comprising recurring units derived from: at least one per(halo)fluorinated monomer selected from the group consisting of tetrafluoroethylene (TFE) and chlorotrifluoroethylene (CTFE), at least one hydrogenated monomer selected from the group consisting of ethylene, propylene and isobutylene, and optionally, one or more additional monomers, in amounts of from 0.1% to 30% by moles, based on the total amount of TFE and/or CTFE and said hydrogenated monomer(s); wherein the polymer (F) is a partially fluorinated fluoropolymer comprising recurring units derived from vinylidene fluoride (VDF), at least one functional hydrogenated monomer comprising at least one carboxylic acid end group and, optionally, at least one fluorinated monomer different from VDF and wherein the functional hydrogenated monomer comprising at least one carboxylic acid end group is selected from the group consisting of (meth)acrylic monomers of formula (I):

wherein each of $R_1$, $R_2$ and $R_3$, equal to or different from each other, is independently a hydrogen atom or a C1-C3 hydrocarbon group.

2. The electrode (E) according to claim 1, wherein the at least one metal salt (M) is present.

3. The electrode (E) according to claim 1 wherein the electrically conductive layer of the current collector comprises Carbon (C) or Silicon (Si) or at least one metal selected from the group consisting of Lithium (Li), Sodium (Na), Zinc (Zn), Magnesium (Mg), Copper (Cu), Aluminium (Al), Nickel (Ni), Titanium (Ti) and alloys thereof including, but not limited to, stainless steel.

4. The electrode (E) according to claim 1 wherein the amount of the medium (L) is at least 40% by weight based on the total weight of said medium (L) and the at least one polymer (F).

5. The electrode € according to claim 1, wherein the current collector consists of the polymer substrate and, adhered to said polymer substrate, the electrically conductive layer and the at least one fluoropolymer layer.

6. The electrode € according to claim 5, wherein the fluoropolymer layer consists of:
the at least one polymer (F),
the at least one compound (EA),
the medium (L),
optionally, the at least one salt (M),
optionally, the at least one compound (C), and
optionally, the one or more additives.

7. The electrode € according to claim 4, wherein the amount of medium (L) is at least 50% by weight, based on the total weight of said medium (L) and the at least one polymer (F).

8. The electrode (E) according to claim 4, wherein the amount of medium (L) is at least 60% by weight, based on the total weight of said medium (L) and the at least one polymer (F).

* * * * *